(12) United States Patent
Witzel et al.

(10) Patent No.: US 8,537,748 B2
(45) Date of Patent: Sep. 17, 2013

(54) TECHNIQUE FOR PERFORMING GSM/WCDMA CIRCUIT SWITCHED SERVICES OVER A LONG TERM EVOLUTION RADIO ACCESS

(75) Inventors: Andreas Witzel, Herzogenrath (DE); Magnus Hallenstal, Taby (SE); Arne Pehrsson, Huddinge (SE); Goran Rune, Linkoping (SE); Jari Tapio Vikberg, Jarna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 678 days.

(21) Appl. No.: 12/602,987

(22) PCT Filed: Jun. 8, 2007

(86) PCT No.: PCT/EP2007/055680
§ 371 (c)(1),
(2), (4) Date: Jun. 1, 2010

(87) PCT Pub. No.: WO2008/148431
PCT Pub. Date: Dec. 11, 2008

(65) Prior Publication Data
US 2010/0303007 A1  Dec. 2, 2010

(51) Int. Cl.
*H04W 4/00* (2009.01)
*H04L 12/56* (2006.01)
*H04L 12/28* (2006.01)
*H04Q 7/20* (2006.01)

(52) U.S. Cl.
USPC ........... 370/328; 370/329; 370/331; 370/352; 370/401; 455/436; 455/466; 709/205

(58) Field of Classification Search
USPC ......... 370/328–356; 375/260; 709/204–227; 455/434–466
See application file for complete search history.

(56) References Cited

U.S. PATENT DOCUMENTS

| 2003/0027569 | A1  | 2/2003  | Ejzak |
| 2005/0002407 | A1* | 1/2005  | Shaheen et al. ............... 370/401 |
| 2005/0003819 | A1  | 1/2005  | Wu |
| 2008/0037515 | A1  | 2/2008  | Sander |
| 2010/0260115 | A1* | 10/2010 | Frederiksen et al. ......... 370/329 |

FOREIGN PATENT DOCUMENTS

| CN | 1823498 A   | 8/2006 |
| GB | 2 402 846 A | 12/2004 |
| WO | 01/76165 A1 | 10/2001 |

OTHER PUBLICATIONS

Mouly, M. et al., "Architecture", GSM Systems for Mobile Communications, Lassay-Les-Chateaux, Europe Media, FR, 1993, pp. 78-122, XP000860002.
Mouly, M. et al., "Radio Resource Management", GSM System for Mobile Communications, Lassay-Les-Chateaux, Europe Media, FR, 1993, pp. 308-430, XP000860006.
Mouly, M. et al., "Mobility and Security Management", 1993, GSM System for Mobile Communications, Lassay-Les-Chateaux, Europe Media, FR, pp. 432-498, XP000860007.

(Continued)

*Primary Examiner* — Afsar Qureshi
(74) *Attorney, Agent, or Firm* — Potomac Patent Group PLLC

(57) ABSTRACT

A method of performing CS (Circuit Switched) services over a LTE (Long Term Evolution) access comprises: performing CM (Connection Management) procedures via an AGW (Access Gateway); and performing MM (Mobility Management) procedures via a MME (Mobility Management Entity).

13 Claims, 18 Drawing Sheets

(56) References Cited

OTHER PUBLICATIONS

Mouly, M. et al., "Communication Management", 1993, GSM System for Mobile Communications, Lassay-Les-Chateaux, Europe Media, FR, pp. 500-565, XP000860008.
3GPP: "3rd Generation Partnership Project; Technical Specification Group Services and System Aspects; 3GPP System Architecture Evolution: Report on Technical Options and Conclusions (Release 7),"3GPP TR 23.882 V1.9.0 (Mar. 2007).
International Search Report for PCT/EP2007/055680, mailed Mar. 11, 2008.
English Translation of Chinese Office Action in corresponding Chinese Application No. 200780053265.6 issued on Mar. 28, 2012.

* cited by examiner

TECHNIQUE FOR PERFORMING GSM/WCDMA CIRCUIT SWITCHED SERVICES OVER A LONG TERM EVOLUTION RADIO ACCESS

TECHNICAL FIELD

The present invention relates to improvements in mobile telecommunication. Embodiments of the invention relate to a technique for performing CS (Circuit Switched) services over a LTE (Long Term Evolution) radio access.

BACKGROUND

Various abbreviations are used in the present specification. These are listed and explained towards the end of the description.

Mobile CS services based on GSM and WCDMA radio access are widely used and allow obtaining telecommunication services with a single subscription in almost all countries of the world. The number of CS subscribers is still growing rapidly, in particular in dense population countries such as India and China. This success is furthermore extended by the evolution of the classical MSC architecture into a softswitch solution which allows using packet transport infrastructure for mobile CS services.

The 3GPP work item "Evolved UTRA and UTRAN" (started in summer 2006) has defined a Long-Term Evolution (LTE) concept that assures competitiveness of 3GPP-based access technology. It was preceded by an extensive evaluation phase of possible features and techniques in the RAN workgroups that concluded that the agreed system concepts can meet most of the requirements and no significant issue was identified in terms of feasibility.

It is envisaged that LTE will use OFDM radio technology in the downlink and SC-FDMA for the uplink, allowing at least 100 Mbps peak data rate for downlink data rate and 50 Mbps for uplink data rate. LTE radio can operate in different frequency bands and is therefore very flexible for deployment in different regions of the world.

In parallel to the RAN standardization 3GPP also drives a System Architecture Evolution (SAE) work item to develop an evolved core network. The SAE core network is made up of core nodes, which are further split, according to a proposal by Ericsson, into Control Plane (MME (1)) and User Plane (AGW (2)) nodes. In the terminology currently used AGW-UP contains both User Plane Entity (UPE) and Inter-Access Anchor (IASA) functionality. The MME is connected to the eNode B (3) via the S1-MME interface and the AGW is connected to the eNode B (3) via the S1-UPE interface. This is illustrated in FIG. 1.

Common to both, LTE and SAE is that only a Packet Switched (PS) domain will be specified, i.e. all services are to be supported via this domain. GSM (via Dual Transfer Mode DTM) and WCDMA however provide both PS and CS access simultaneously. While the mobile CS service penetration is still increasing world-wide, there is no support planned in standards for using these mobile CS telephony (MSS) solutions via an LTE radio access (6) or via the SAE based core network. As FIG. 2 shows, there is no connection between LTE radio (6) and Classic CS (13).

SUMMARY

The present inventors have considered how telephony services can be deployed over LTE radio access, i.e. how LTE/SAE can be used as access technology to the existing MSS infrastructure. The investigated solutions have been called "CS over LTE" solutions, or short "CSoLTE".

Embodiments of the present invention aim to provide a solution for performing CS (Circuit Switched) services over a LTE (Long Term Evolution) radio access. According to a first aspect of the invention there is provided a method of performing GSM/WCDMA (Global System for Mobile Communications/Wideband Code Division Multiple Access) CS (Circuit Switched) services over a LTE (Long Term Evolution) radio access. The method comprises performing CM (Connection Management) procedures via an AGW (Access Gateway) interconnected with a PMSC (Packet Mobile Switching Centre), and performing MM (Mobility Management) procedures via a MME (Mobility Management Entity) interconnected with the PMSC.

The CS services may be performed between a terminal and a PSTN (Public Switched Telephone Network) via the PMSC.

The MM procedures may be transported over IP-based protocols between the PMSC and the terminal using the LTE radio access. Furthermore, the CM procedures may be transported between the AGW and a MSC-S (Mobile Switching Centre Server) of the PMSC using a PCSC (Packet CS Controller).

In one embodiment of the invention, the MME provides information about the mobility of the terminal to the PMSC.

According to a first aspect of the invention, there is provided a combination of an AGW (Access Gateway) and a MME (Mobility Management Entity) for use in a telecommunication network for performing CS (Circuit Switched) services over a LTE (Long Term Evolution) radio access. CM (Connection Management) procedures are arranged to be performed via the AGW (Access Gateway), and MM (Mobility Management) procedures are arranged to be performed via the MME (Mobility Management Entity).

The CS services may be arranged to be performed between a terminal and a PSTN (Public Switched Telephone Network) via a PMSC (Packet Mobile Switching Centre), and the MM procedures mat be arranged to be transported over IP-based protocols between the PMSC and the terminal using the LTE radio access. Furthermore, wherein the CM procedures may be arranged to be transported between the AGW and a MSC-S (Mobile Switching Centre Server) of the PMSC using a PCSC (Packet CS Controller).

The MME, according to an embodiment of the invention, may be arranged to provide information about the mobility of the terminal to the PMSC.

According to a third aspect of the invention, there is provided a MSC (Mobile Switching Centre) for use in a telecommunication network for performing CS (Circuit Switched) services over a LTE (Long Term Evolution) access. The MSC comprises means for communicating with an AGW (Access Gateway) for performing CM (Connection Management) procedures via the AGW, and means for communicating with a MME (Mobility Management Entity) for performing MM (Mobility Management) procedures via the MME.

The CS services may be arranged to be performed between a terminal and a PSTN (Public Switched Telephone Network) via the MSC. The MM procedures may be arranged to be transported over IP-based protocols between the MSC and the terminal using the LTE radio access. In one embodiment, the MSC may comprise a MSC-S (Mobile Switching Centre Server) and a PCSC (Packet CS Controller), wherein the CM procedures are arranged to be transported between the AGW and the MSC-S via the PCSC. The MSC may be arranged to receive information about the mobility of the or a terminal from the MME. Furthermore, the MSC may be a PMSC (Packet Mobile Switching Centre).

DETAILED DESCRIPTION

Figure 1:
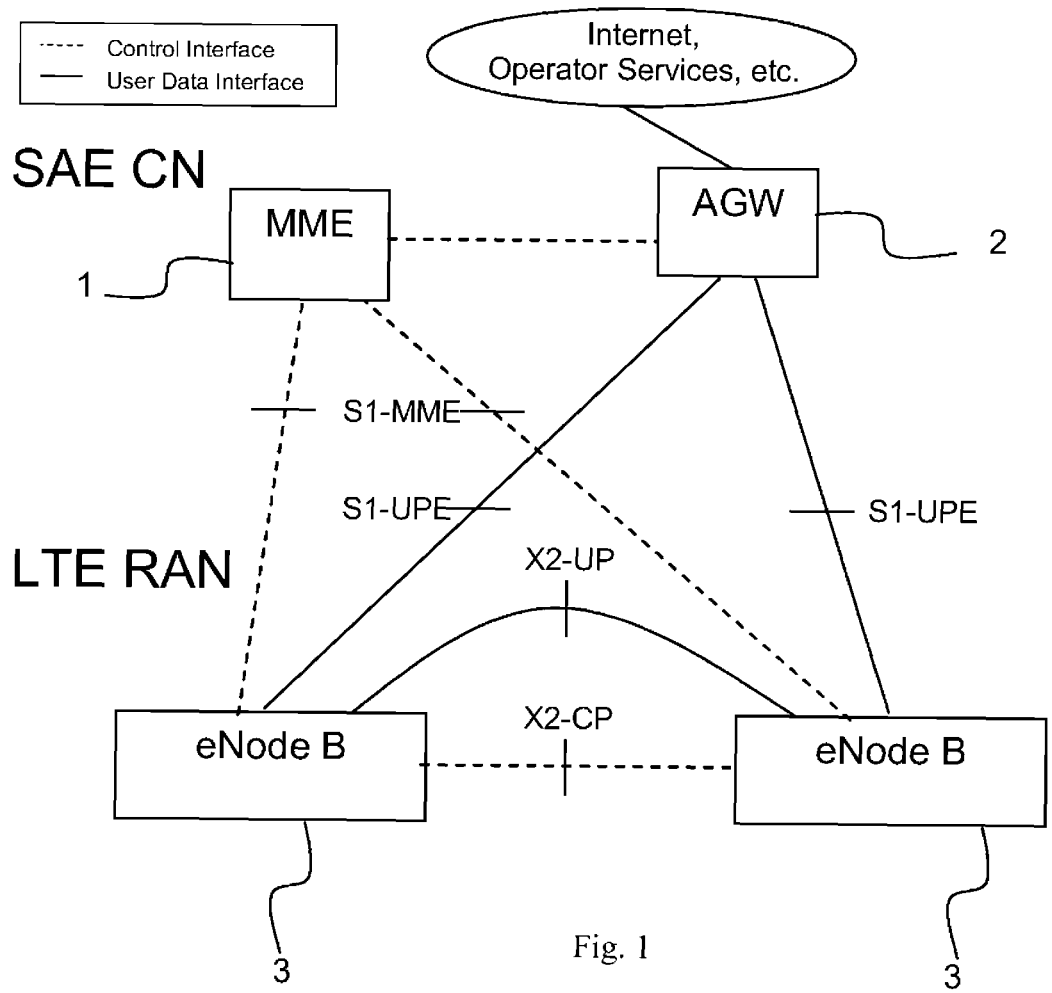
FIG. 1 shows the SAE and LTE interfaces.
Figure 2:
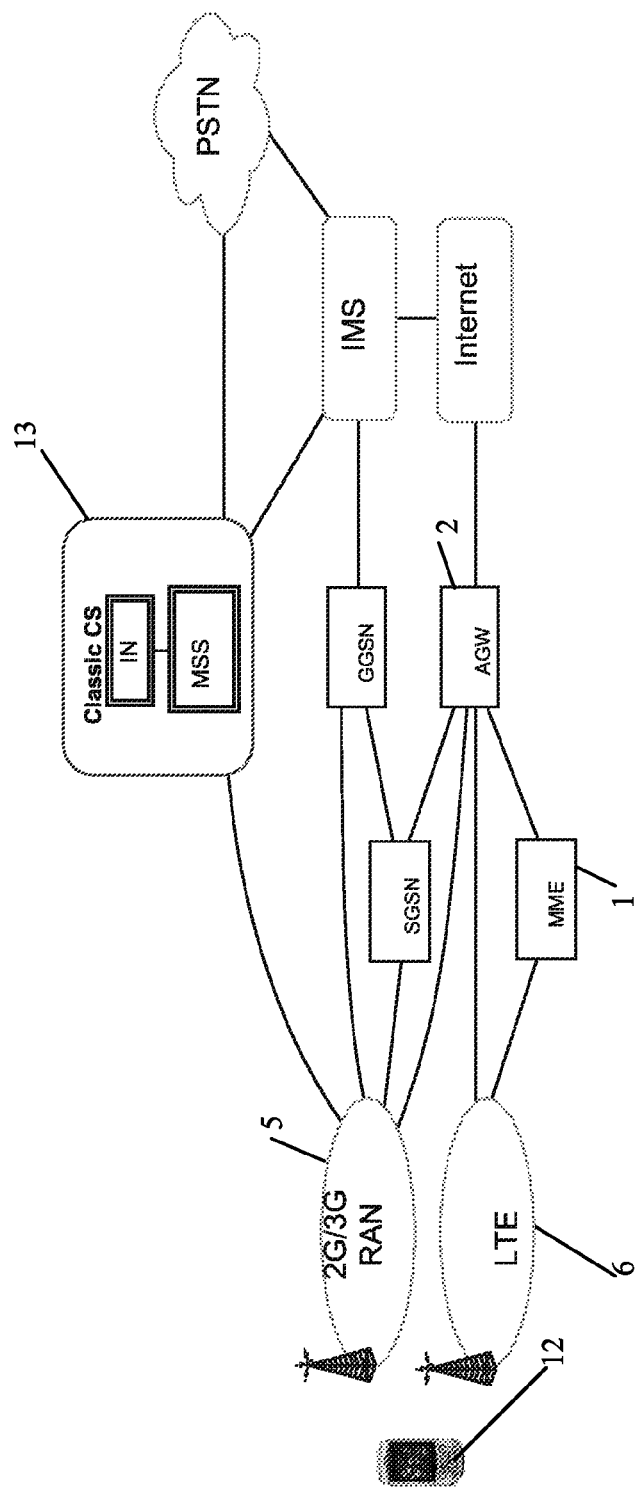
FIG. 2 shows the relation between the classical CS Domain and LTE/SAE radio.
Figure 3:
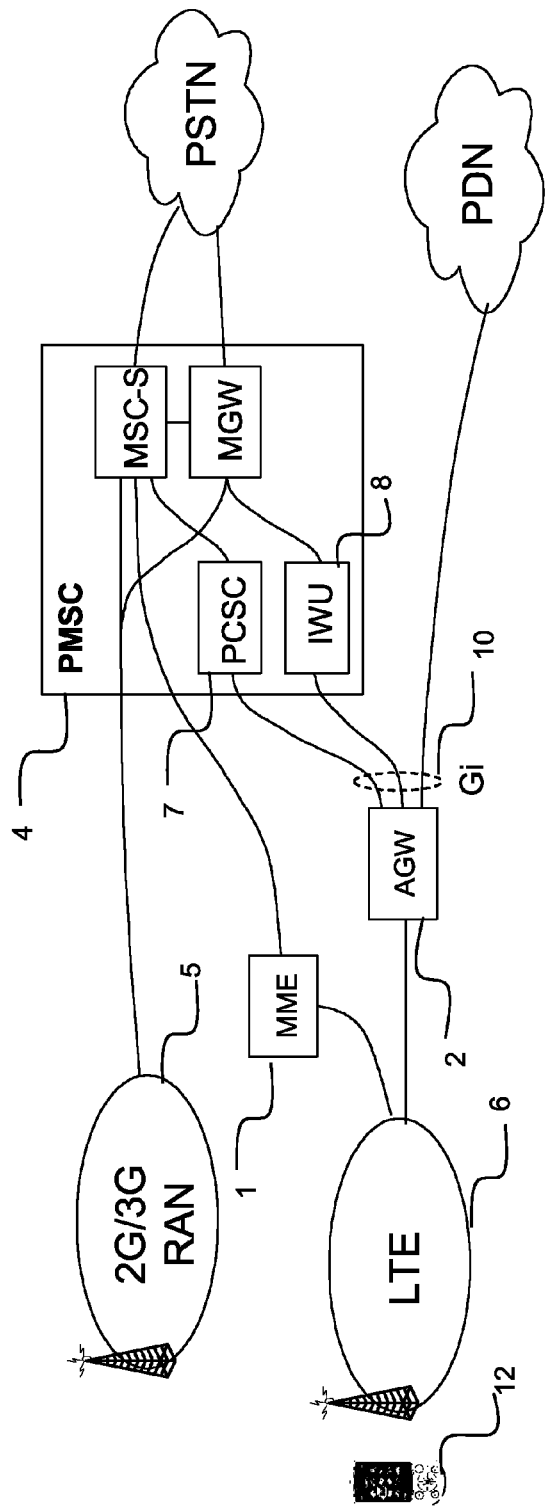
FIG. 3 shows the basic architecture according to embodiments of the present invention.

The basic architecture for the CSoLTE solutions is shown in FIG. 3. As shown in FIG. 3, the Packet MSC (PMSC (4)) can be serving both traditional 2G and 3G RANs (5) and the new CS over LTE based solutions. The Packet MSC (4) contains two new logical functions called Packet CS Controller (PCSC (7)) and Interworking Unit (IWU (8)) that are further described in relation to FIG. 4.

The communication between the terminal (12) and the PMSC (4) is based on the Gi interface (10). This means that all direct communication between the terminal (12) and the PCSC (7) and the IWU (8) in the PMSC (4) is based on IP protocols and that the terminal (12) is visible and reachable using an IP-address via the Access Gateway (AGW (2)).

Figure 4:
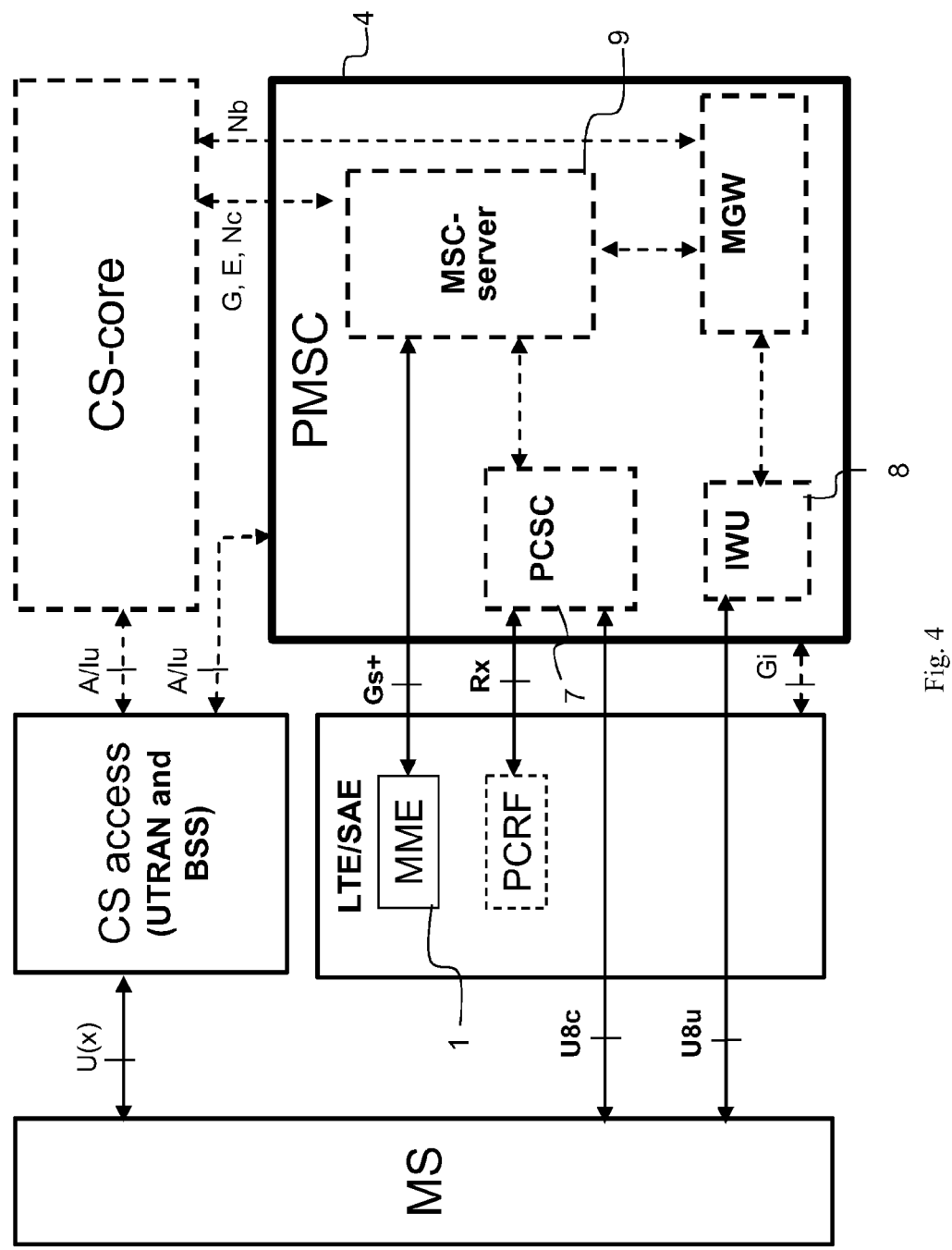
FIG. 4 shows the reference architecture according to embodiments of the present invention.

As shown in FIG. 4, this communication is divided into two different interfaces, U8c for the control plane and U8u for the user plane. The PCSC (7) also has an Rx interface to the PCRF for allocation of LTE/SAE bearers.

Three solutions for providing CSoLTE service have been identified in the course of the investigation.

The first solution is called "CS Fallback" and means that the terminal (12) is performing SAE MM procedures towards the MME (1) while camping on LTE radio access (6). The MME (1) then registers the terminal (12) in the MSC-S (9) for CS based services. When the MSC-S (9) pages the terminal (12) for terminating CS services, this request is forwarded to the terminal (12) via the MME (1) and then the terminal performs fallback to the 2G or 3G RANs (5). Similar behavior applies for Mobile originated CS services, and when these are triggered by the user and the terminal (12) is camping on LTE radio access (6), the terminal will fallback to 2G or 3G RANs and trigger the initiation of the originating CS service there.

The second solution identified in the course of the investigation, to which embodiments of the present invention relate, is called CS over LTE Integrated (or short CSoLTE-I). In this solution the same SAE MM procedures as for the "CS Fallback" solution are used, but instead of performing fallback to the 2G or 3G RANs (5), the terminal (12) will perform all the CS services over the LTE radio access (6). This means that the CS services (established and controlled via Connection Management, CM, procedures) are transported over IP-based protocols between the PMSC (4) and the terminal (12) using the LTE radio access (6) and the SAE nodes like AGW-UP.

The third solution is called CS over LTE Decoupled (or short CSoLTE-D). In this case both MM and CM procedures are transported over IP-based protocols directly between the PMSC (4) and the terminal (12) using the LTE radio access (6) and the SAE user plane nodes like the AGW-UP.

Figure 5:
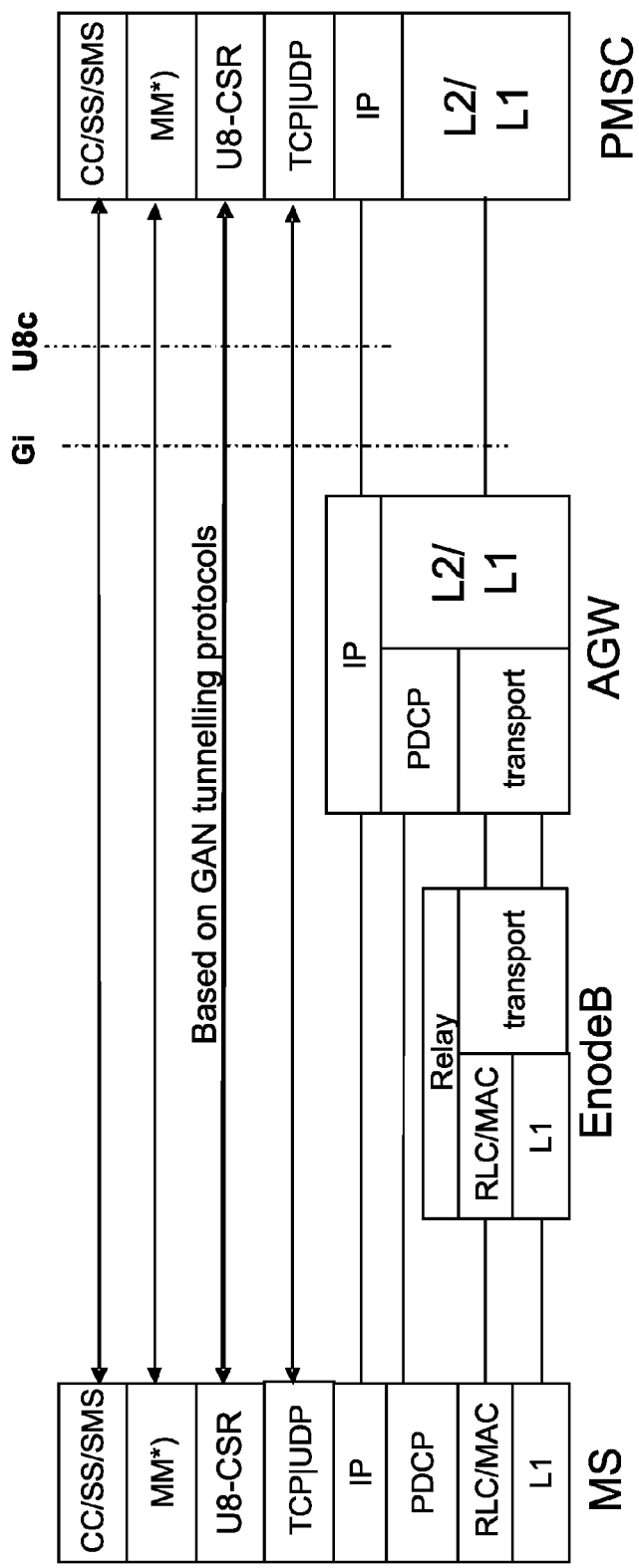
FIG. 5 shows the control plane protocol architecture according to embodiments of the present invention.
Figure 6:
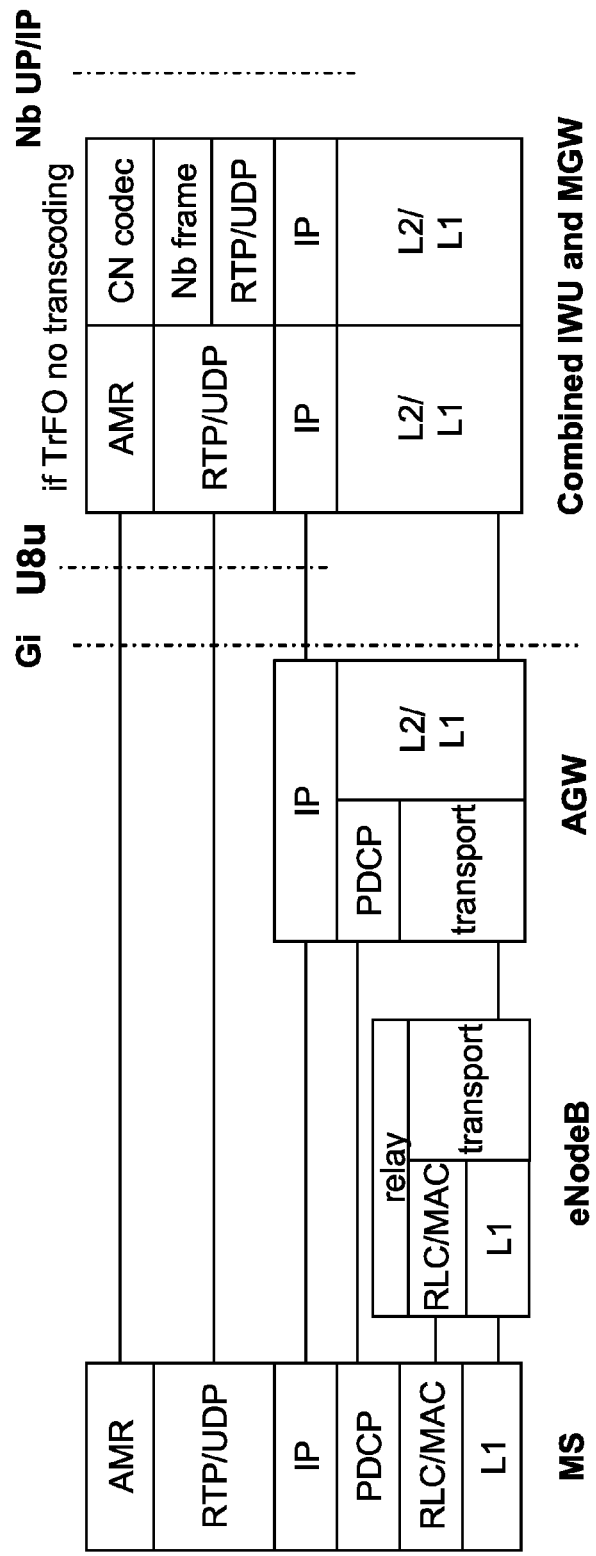
FIG. 6 shows the user plane protocol architecture according to embodiments of the present invention.

FIG. 4 illustrates the interfaces of the PMSC (4). FIG. 5 shows the control plane protocol architecture between the terminal (12) and the PMSC (4) (i.e. the U8c interface), and FIG. 6 shows the user plane protocols between the terminal (12) and the PMSC (4) (i.e. the U8u interface).

Whilst in principle it would be possible to have a LTE radio bearer in parallel to a GSM/WCDMA CS radio bearer in a similar fashion as it is possible in WCDMA, this would require two independent radio transmitter/receiver modules in the terminal (12), which would increase the terminal size, affect battery lifetime and terminal production costs. Such a solution is therefore not particularly attractive.

It would also be possible to re-implement or port the mobile CS services into an IMS Application Server such that these are available also via LTE/SAE access. However, not all mobile CS services can be realized when placed as IMS AS, and therefore this option is not regarded as particularly beneficial either. In addition, this option would still require a full deployment of the IMS architecture on top of the LTE/SAE deployment.

By way of contrast, the present invention enables the use of LTE/SAE as access technology to the existing MSS infrastructure. This approach decouples the mobile CS services from the IMS deployment and reuses the entire deployed MSS infrastructure. Furthermore it allows using LTE/SAE broadband packet access in parallel to the mobile CS services, in other words, the present invention provides a solution for connecting LTE/SAE and MSS in order to retain the existing mobile CS services.

Embodiments of the present invention have some or all of the following features:

MSS is extended with two logical functions, the Packet CS Controller (PCSC (7)) and an Interworking Unit (IWU (8)).
The terminal (12) uses the tracking area concept of the LTE radio access network.
The SAE mobility management provided by SAE MME (1) is used.
MME (1) and MSC-S (9) are interconnected by a modified Gs interface, here denoted as Gs+ (11).
The MME (1) informs the MSC-S (9) about the mobility events of the subscriber.

For terminating CS calls, paging is indicated from the MSC-S (9) to the MME (1) via that Gs+ interface (11). A SAE/LTE bearer is established and connected to the PMSC (4) over the Gi interface (10).

As mentioned above, MSS is extended with two logical functions, the Packet CS Controller (PCSC (7)) and an inter-working Unit (IWU (8)). These logical functions may be:
- implemented in the MSC-S (9) and the MGW, and this combination is then called PMSC (4) (or eMSC-S)
- implemented as one or two stand-alone nodes
- or implemented in the MME (1) and the AGW (2)

The PCSC (7) has a control plane interface to the terminal (here called U8c) and an Rx interface to the PCRF for allocation of LTE radio bearers. The U8c interface towards the terminal (12) via LTE/SAE is based on Gi interface (10). The Gs interface (11) of the MSC-S (9) is enhanced (herein abbreviated "Gs+") and interconnects the MSC-S (9) with the SAE MME (1). The IWU (8) also interfaces LTE/SAE via Gi type of interface and by that provides a direct bearer to the terminal (12) called U8u.

Figure 7:
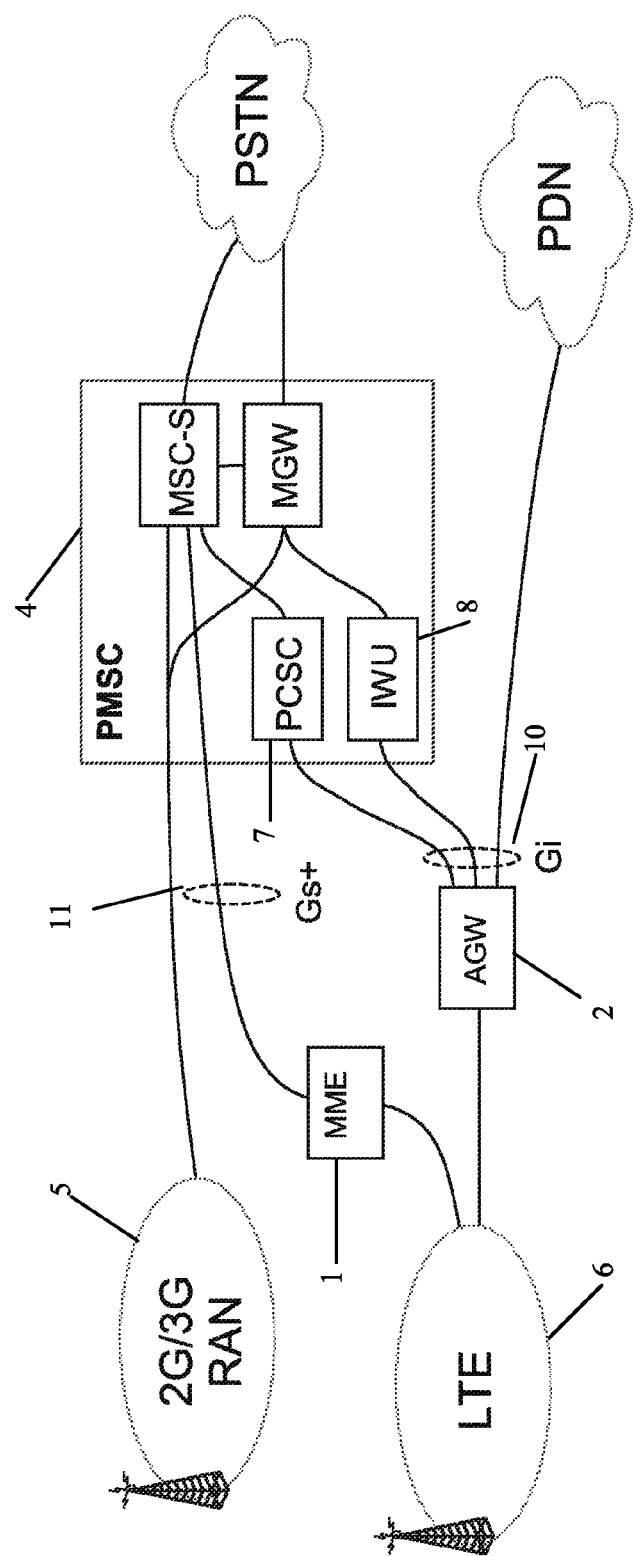
FIG. 7 shows the architecture according to embodiments of the present invention, using a modified Gs interface.
Figure 8:
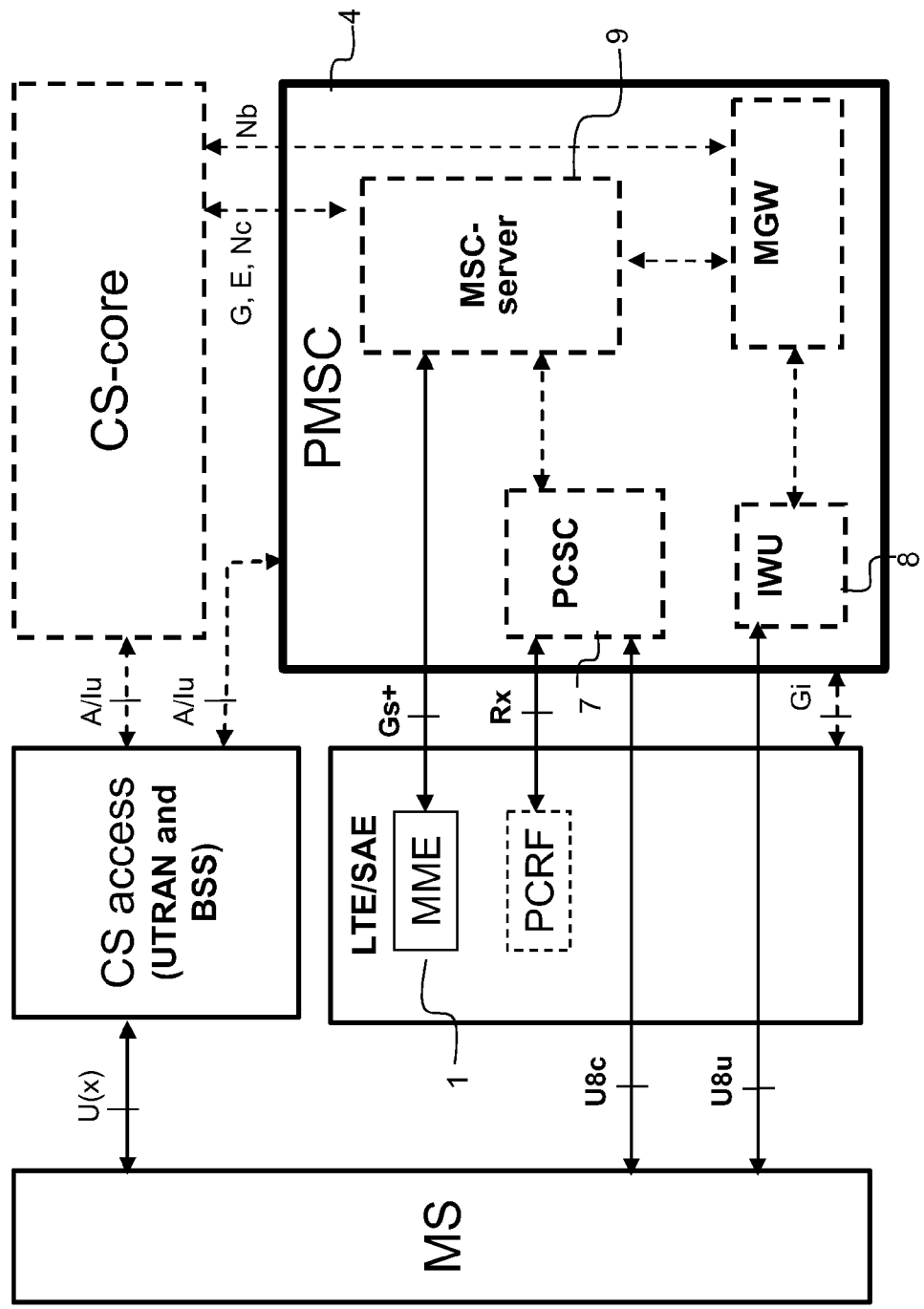
FIG. 8 shows the reference architecture according to embodiments of the present invention.

The CSoLTE architecture using the Gs+ interface (11) is illustrated in FIG. 7, and the interfaces of the PMSC (4) are shown in FIG. 8.

Figure 9:
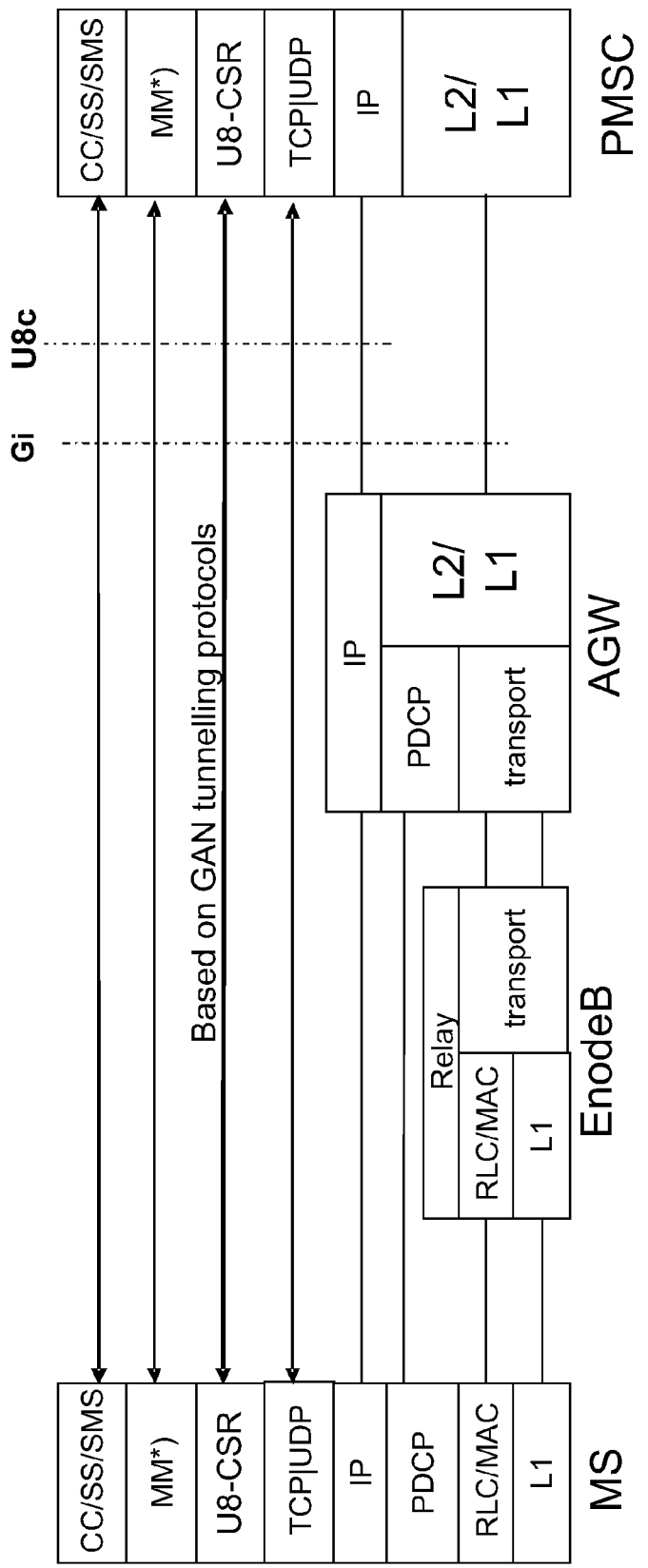
FIG. 9 shows the control plane protocol architecture for CM according to embodiments of the present invention.

The CSoLTE control plane protocol architecture between the terminal (12) and the PMSC (4) (i.e. the U8c interface) is shown in FIG. 9. Note that, in FIG. 9, MM stands for CM over MM, MM stacks being shown in FIG. 8.

Figure 10:
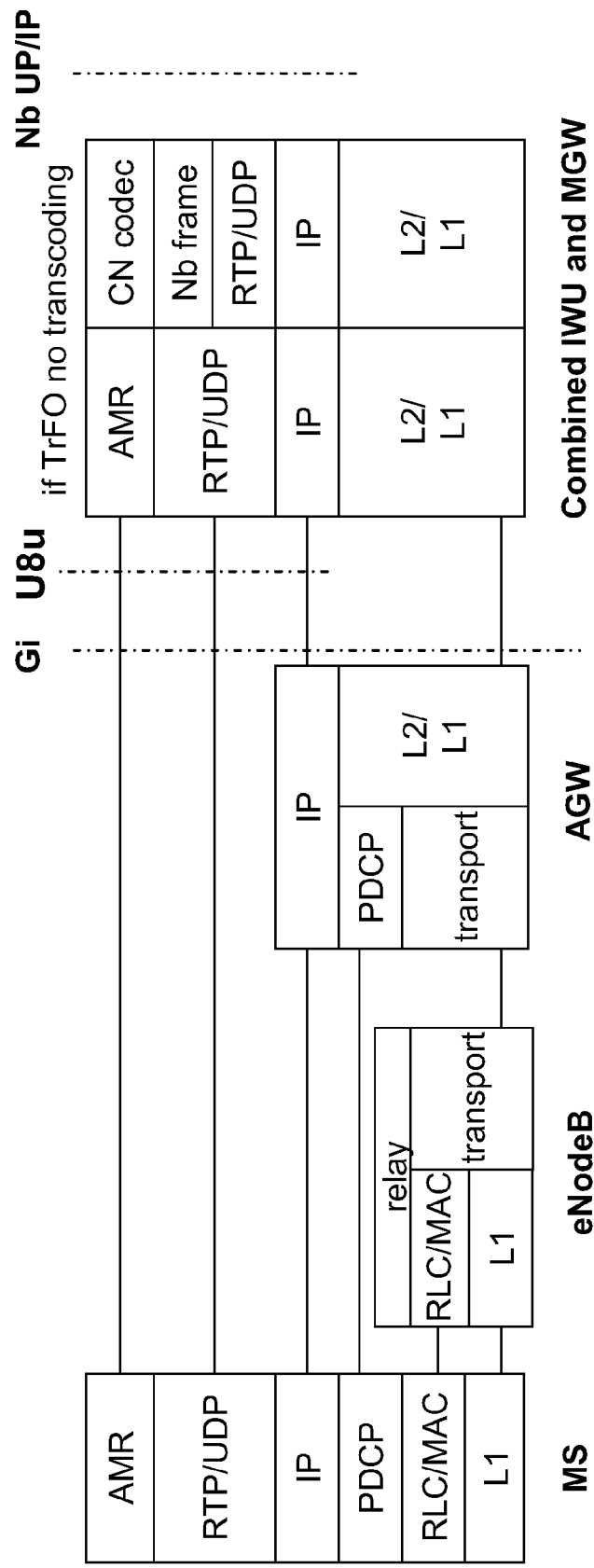
FIG. 10 shows the user plane protocol architecture according to embodiments of the present invention.

The user plane protocols between the terminal (12) and the PMSC (4) (i.e. the U8u interface) are shown in FIG. 10.

Some further sub-aspects of embodiments of the invention will now be described.

LTE Terminal Mobility

At the time of writing the LTE/SAE mobility is still under discussion in 3GPP, but we can assume that LTE/SAE will be based on a geographical structure called tracking areas (TA).

Figure 11:
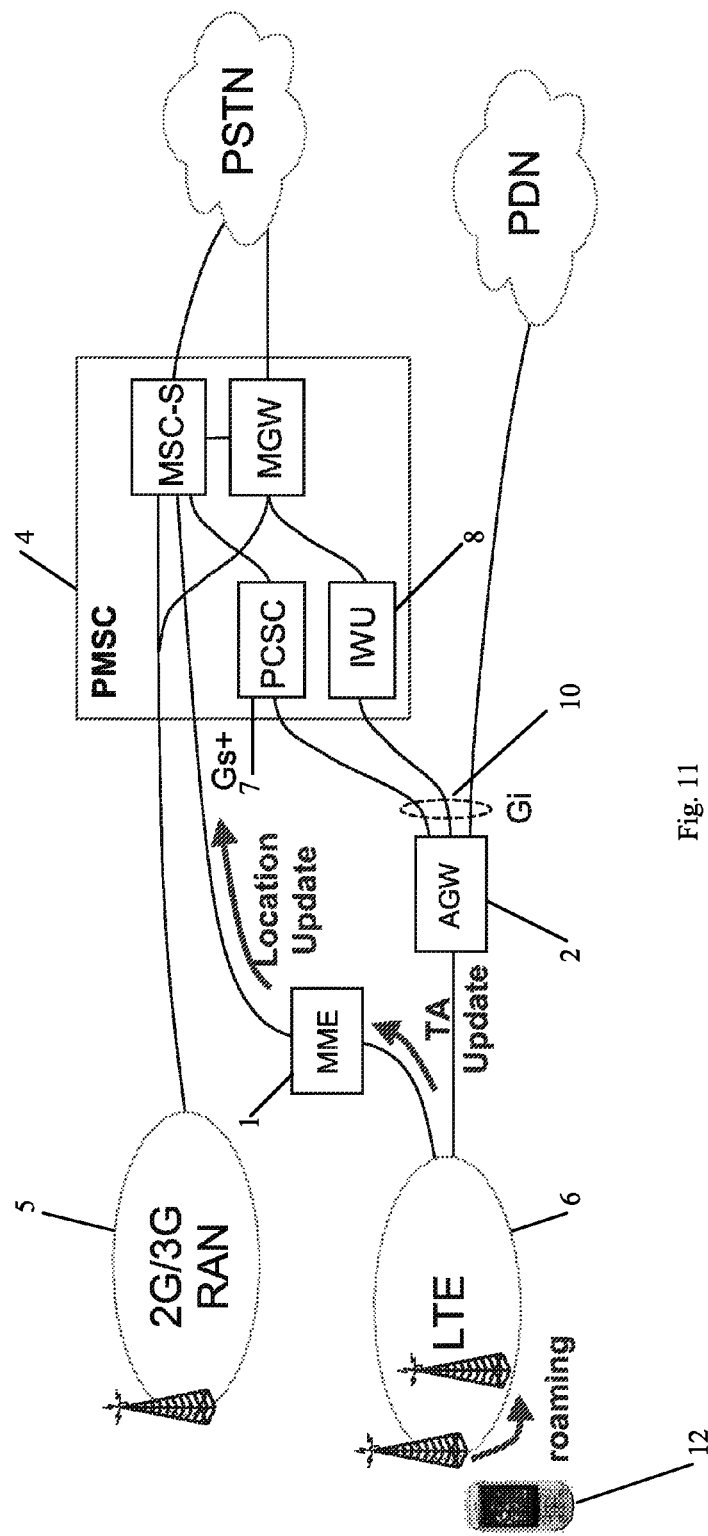
FIG. 11 shows the architecture according to embodiments of the present invention illustrating terminal mobility.

Regardless of what concept will finally be chosen, when roaming within the LTE radio access area, the terminal (12) will report its mobility to the MME (1), as shown in FIG. 11. The PMSC (4) in turn subscribes to the MME (1) that it is interested in the mobility events of the terminal (12).

Figure 12:
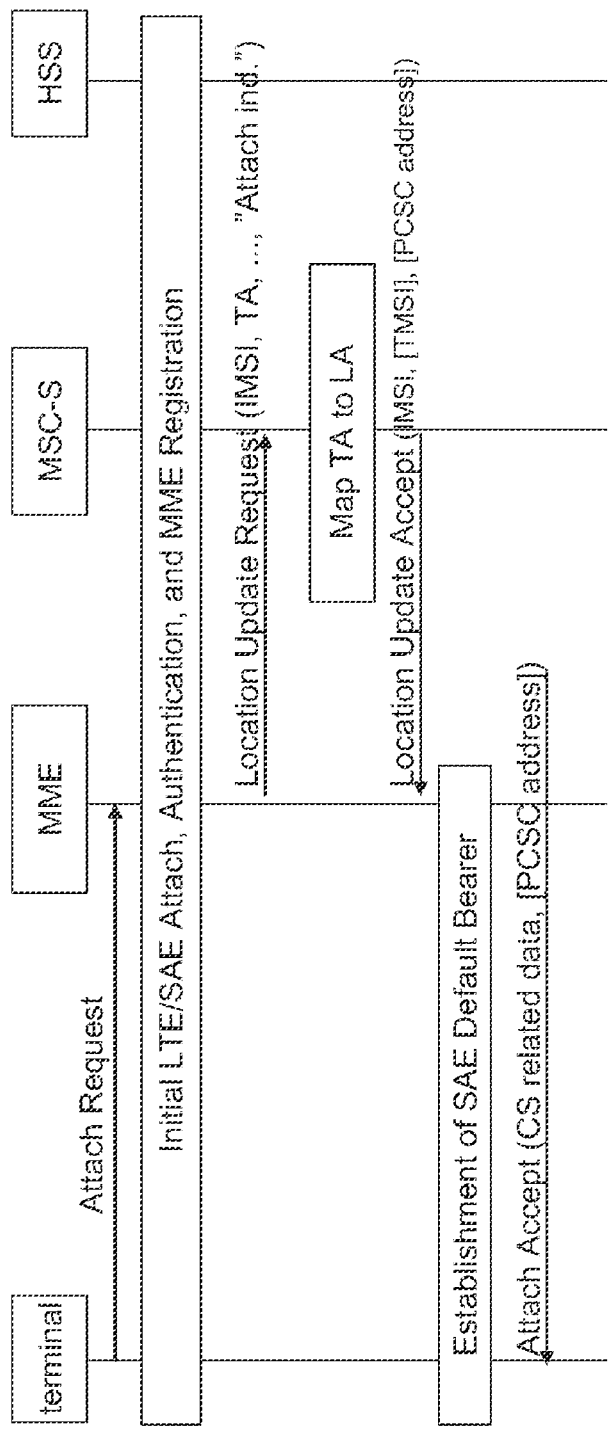
FIG. 12 shows a signalling diagram illustrating Initial Attach.

Hence when a terminal (12) initiates an attach request to the MME (1), the MME (1) will inform the PMSC (4) about this event and the new geographical area the terminal (12) is then in (see also FIG. 12). This information is passed to the MSC-S (9) via a modified Gs interface (11), as illustrated in FIG. 11. The existing Gs-interface connects the VLR type of databases in MSC and SGSN. It is used to convey circuit-switched MM procedures via SGSN. This saves resources on A-interface, and traffic handling capacity in the MSC increases. In some scenarios, the SGSN knows the terminal location on cell level and therefore the paging area can be limited to one cell only (instead of the whole Location Area).

Advantageously, according to embodiments of the invention, instead of using LAI or SAI as for GSM and WCDMA radio access, in the LTE/SAE case the TA is passed to the MSC-S (9).

Internally within the MSC-S (9) the TA can be converted to SAI and LAI, so that all the existing mobile CS services based on LAI and SAI work unaffected.

Figure 13:
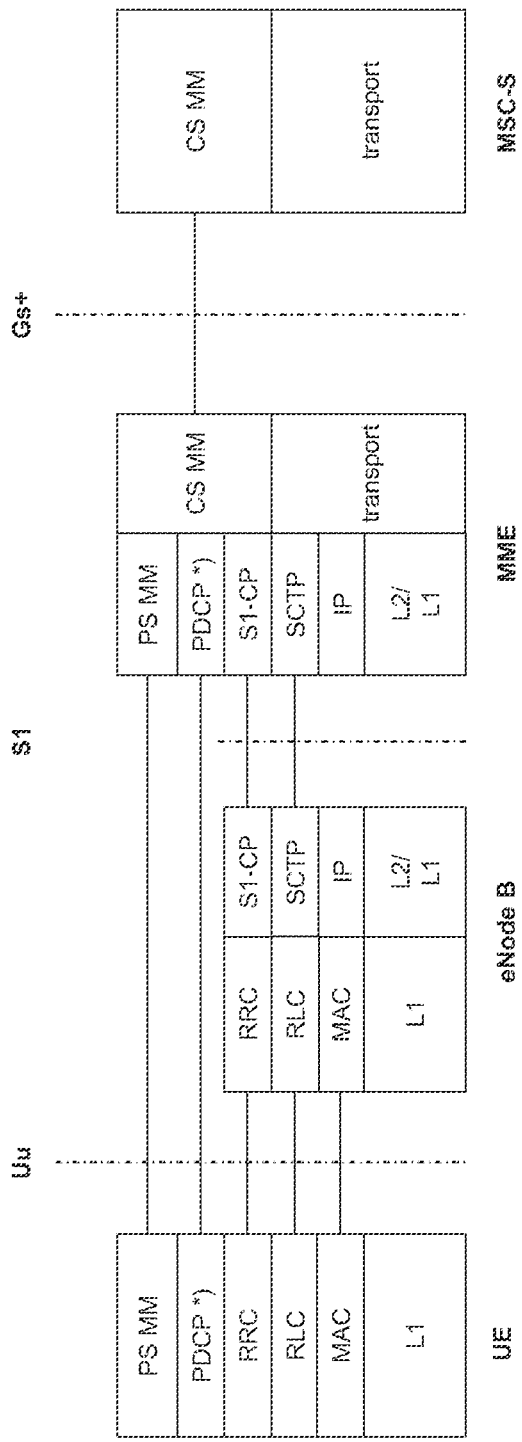
FIG. 13 shows protocol stacks for the modified Gs interface according to embodiments of the present invention.

FIG. 13 shows the protocol stacks for this mobility solution.

It is worth noting that according to an alternative embodiment the Gs interface and the MSC-S (9) are left unmodified and the mapping of the TA geographical information to LAI/SAI is placed in the MME (1).

The handling at LTE roaming is very similar to the above attach case.

Figure 14:
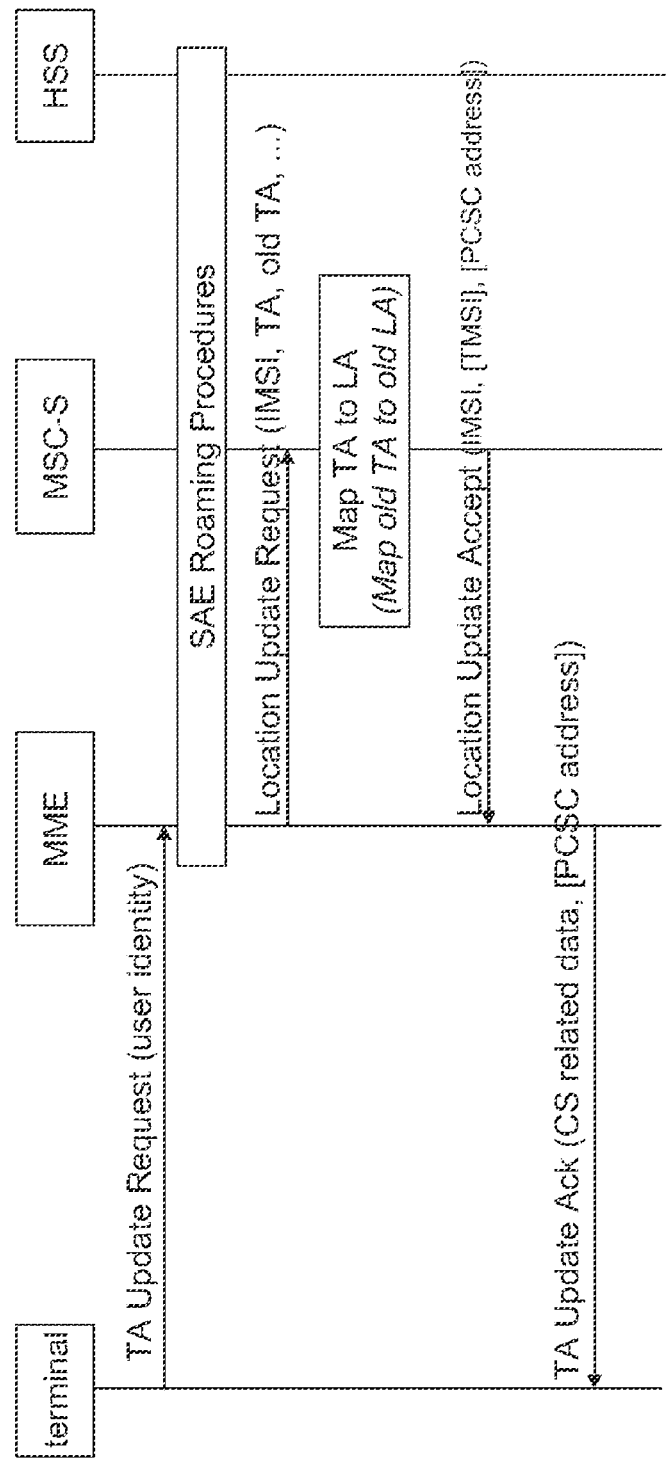
FIG. 14 shows a signalling diagram illustrating Roaming.

As illustrated in FIG. 14, during roaming the terminal (12) informs the MME (1) that it is reachable in a new TA. The MME (1) informs the MSC-S (9) accordingly. The MSC-S (9) (or alternatively the MME (1)) maps the received TA information to corresponding LAI/SAI.

It is envisaged, pursuant to the invention, that the information provided at attach contains information on whether the terminal (12) shall fallback to GSM/WCDMA radio when initiating a call (this is the "first solution" discussed near the beginning of the specification) or whether it shall establish the related bearer via LTE radio (6). As a default, if the information provided at attach does not contain any such information then the terminal (12) will fallback to GSM/WCDMA radio. However, we will assume here that such information is provided and that it indicates that the terminal (12) shall establish the related bearer via LTE radio (6).

Paging

In GSM/WCDMA paging is used to find the cell where the terminal (12) is currently located and to wake-up the terminal from idle mode. If the MSC initiates paging via the existing Gs interface, the SGSN may know the terminal location on cell level and therefore the paging area can be limited to one cell only (instead of the whole Location Area).

Figure 15:
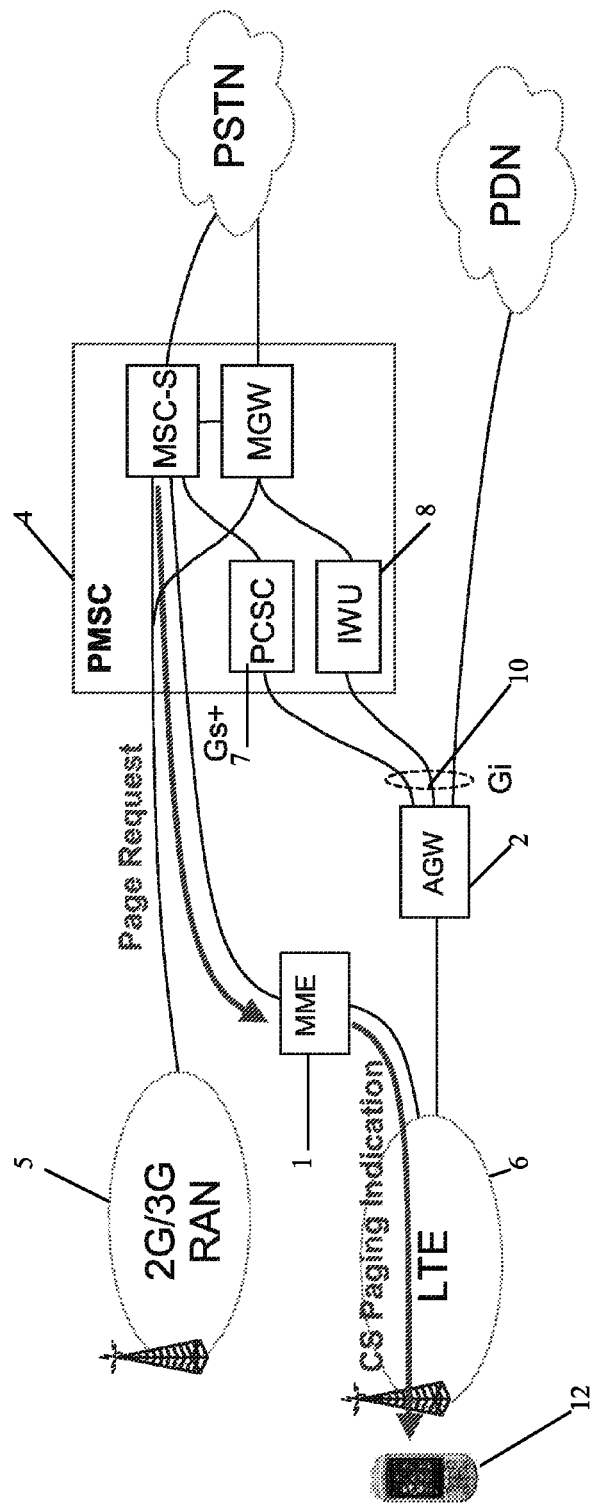
FIG. 15 shows a signalling diagram illustrating Paging via the modified Gs interface.

In LTE/SAE there is no concept of paging as such. Any packet delivered to the terminal (12) will cause the terminal to wake-up and change state from idle to active. Accordingly, when camping on LTE radio coverage, no paging in the traditional sense is needed. The MME (1) maps the Page Request received from the MSC-S (9) via the Gs+ interface (11) to a simple CS-paging-indication (or wake-up pilot packet) sent to the terminal (12). This is illustrated in FIG. 15.

This CS-paging-indication contains also an indication of whether the terminal (12) shall fallback to GSM/WCDMA radio when initiating the call or shall establish the related bearer via LTE radio (6). Here the latter is described.

For the delivery of the CS-paging-indication two options are possible:

Option 1:

If the terminal (12) is in idle state, first deliver a very short "pilot" packet in order to wake-up the terminal. Then in active state deliver the CS-paging-indication including all related paging data. The advantage of this option is that the pilot packet can be very short, and this will save bandwidth on the broadcast channel (which is a shared resource for all terminals in the TA). In this case all paging related data is sent on a dedicated signaling channel (dedicated for this terminal (12)).

Option 2:

If the terminal (12) is in idle state, immediately send the CS-paging-indication including all related paging data. In this case all paging related data is sent via the broadcast channel. This option provides a faster response, but loads the broadcast channel (which is a common resource for all terminals in that TA).

Option 3:

If the terminal (12) is in active state, the existing dedicated signaling channel can be used for the delivery of the CS-paging-indication including all related paging data.

Terminating Call Setup

Figure 16:
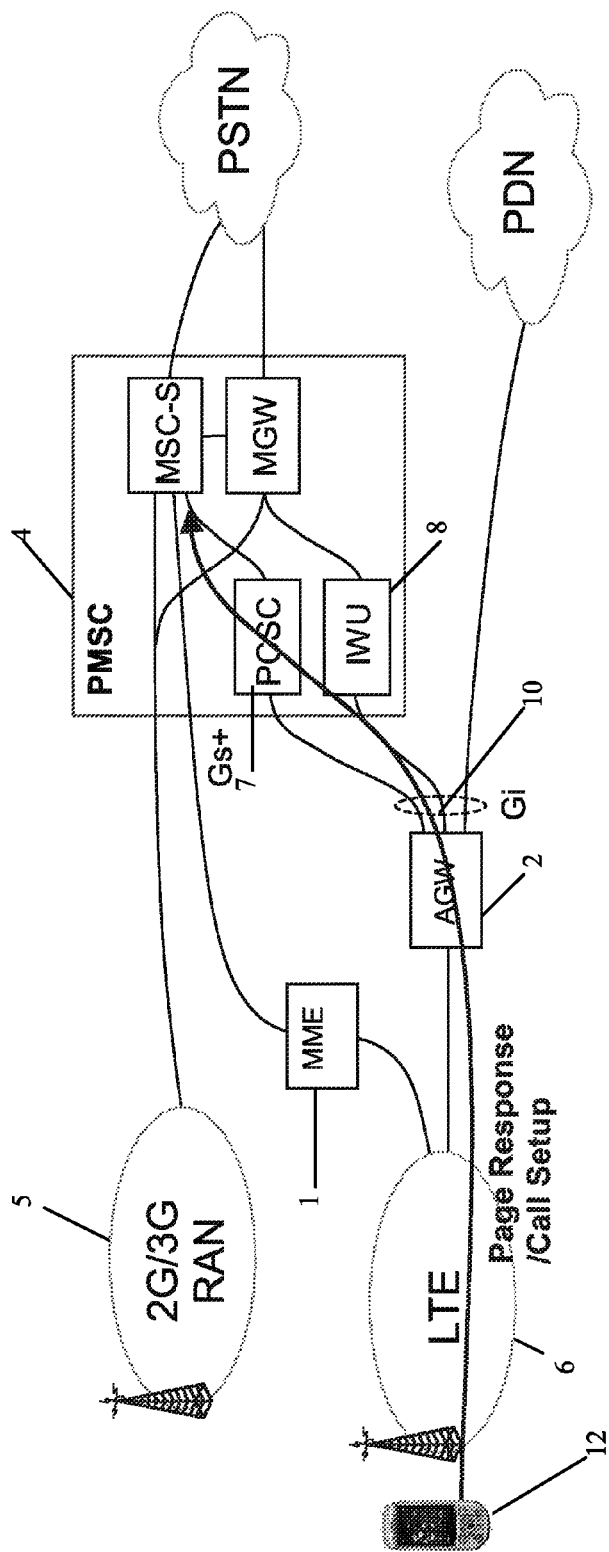
FIG. 16 shows a signalling diagram illustrating a Page Response and LTE/SAE bearer establishment.

After reception of the CS-paging-indication, the terminal (12) analyzes what radio access to use for the call. Here it is assumed that the call shall be established via the LTE radio access (6), as shown in FIG. 16.

In order to respond to paging, the terminal (12) has to discover the serving PMSC (4).

This can be done using different options:

Option 1:

When sending the CS-paging-indication, the MME (1) includes the signaling address of the PMSC (4) which initiated the Page Request. This method can be used if the PCSC (7) is co-located with the MSC-S (9), and/or the MSC-S (9) is aware of the PCSC (7) signaling address.

Figure 17:
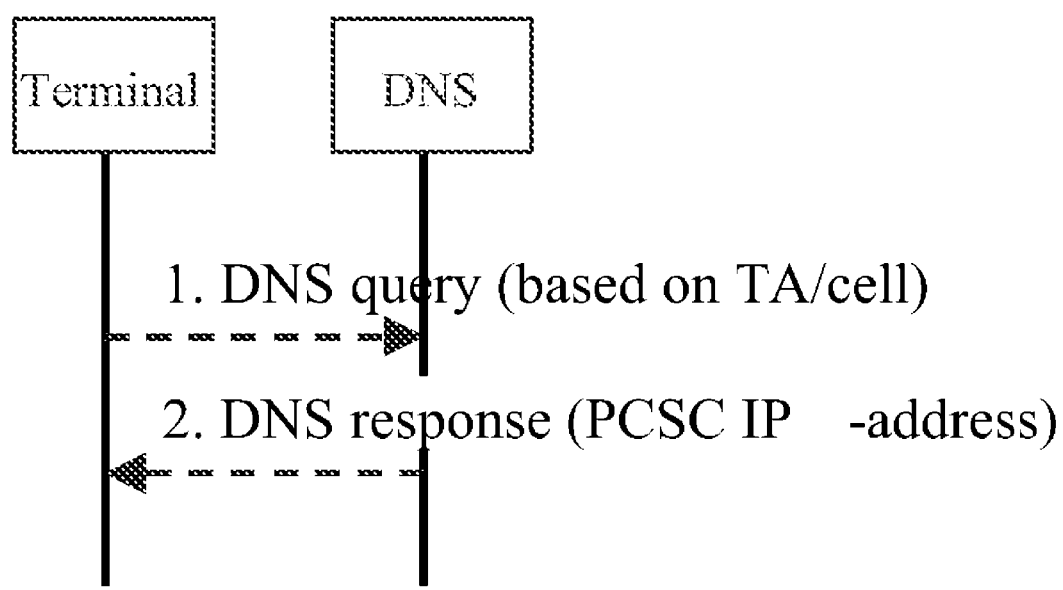
FIG. 17 shows a signalling diagram illustrating a PCSC Discovery procedure.

Option 2:

The terminal (12) has to determine the PCSC (7) address based on a LAI information included in the CS Paging Indication. LAI is normally not included in the CS Paging message that the terminal (12) receives, but embodiments of this invention propose to add a unique geographical identity (such as cell or LAI) for this purpose. The discovery can be done by a DNS lookup using the LAI/cell as input. The DNS returns the address of the PCSC (7). This related signaling sequence for this DNS based PCSC discovery is shown in FIG. 17.

Option 3:

It is also possible that the terminal (12) discovers the PMSC (4) based on the current TA of the terminal. This is a variant of option 2, and instead of using the LAI in the CS paging message, the terminal (12) performs the DNS query based on the current TA. The DNS returns the address of the PCSC (7).

Figure 18:
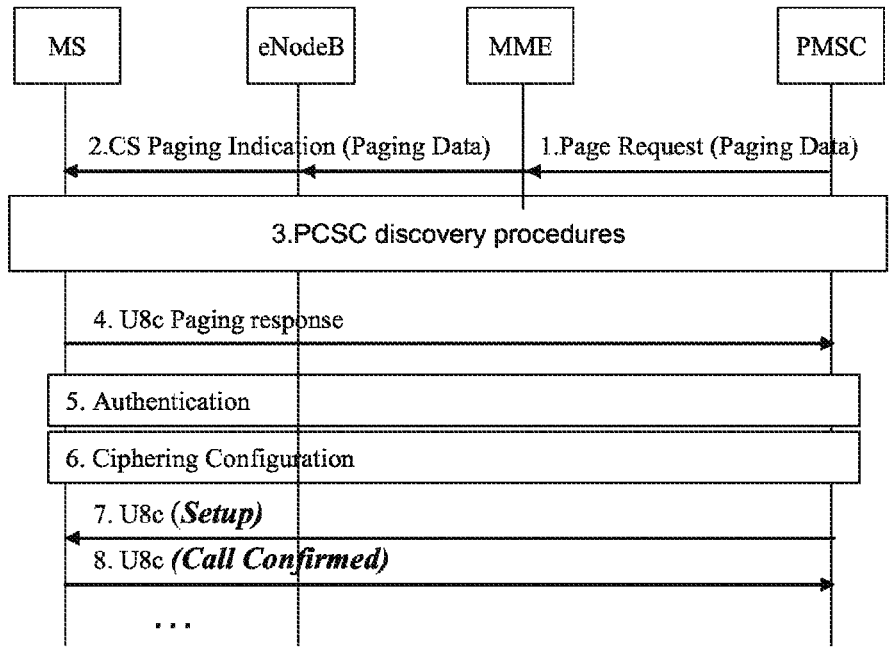
FIG. 18 shows a signalling diagram illustrating the establishment of a terminating call.

Referring to FIG. 18, the terminal (12) replies the Page Response via a dedicated LTE signaling bearer to the PMSC (4). This is done via the U8c reference point.

The call setup procedures are as for CS calls today.

Mobile Originated CS Transactions (Calls, SMS, SS, LCS)

When the terminal (12) has to initiate a call, it first has to determine whether it shall fallback to GSM/WCDMA radio for setting up this call. Information received from the PMSC (4) at initial attach and location update can indicate to the terminal (12) how to behave.

Figure 19:
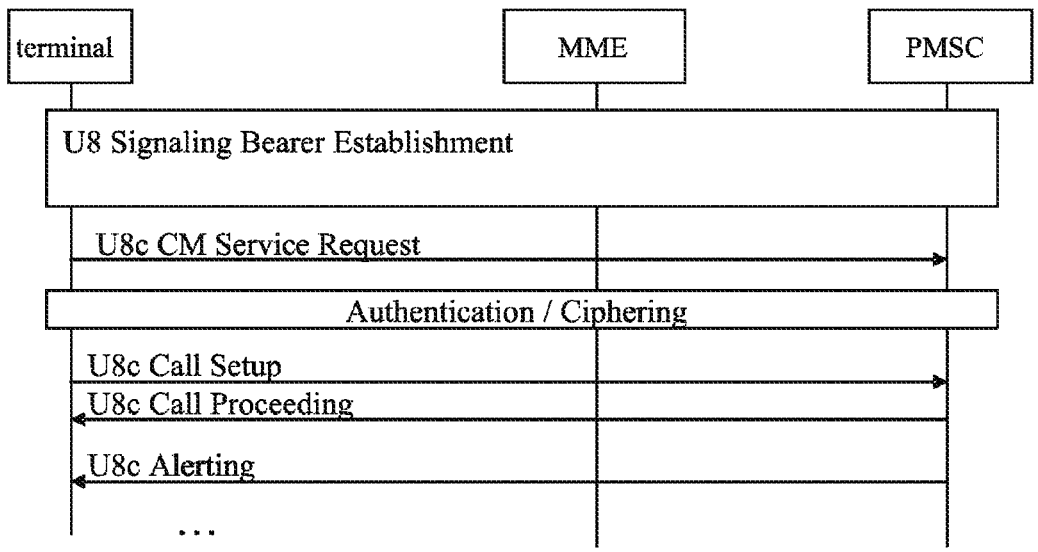
FIG. 19 shows a signalling diagram illustrating the establishment of a terminal initiated call.

The case that the call has to be initiated over LTE radio access (6) is shown in FIG. 19.

In an alternative embodiment the terminal (12) does a PCSC (7) discovery as described above as option 3 at the terminating call, so using the TA as input to a DNS query.

SMS or SS-Procedures

SMS and SS-Procedures are handled in a similar way; for those only a dedicated LTE signaling channel is needed.

To summarize, at least preferred embodiments of the present invention have the following main advantages:

It is possible to retain the existing mobile CS services also via LTE/SAE access.

The installed MSS infrastructure can be reused.

LTE/SAE broadband access and mobile CS services are possible in parallel

Abbreviations

LTE Long Term Evolution
SAE Service Architecture Evolution
CSoLTE CS Services over LTE Radio Access
CS Circuit Switched
DTM Dual Transfer Mode
GSM Global System for Mobile Communications
WCDMA Wideband Code Division Multiple Access
MSC Mobile Switching Centre
3GPP 3rd Generation Partnership Project
UTRA Universal Terrestrial Radio Access
UTRAN UMTS Terrestrial Radio Access Network
UMTS Universal Mobile Telecommunications System
RAN Radio Access Network
OFDM Orthogonal Frequency Division Multiplexing
SC-FDMA Single Carrier FDMA
FDMA Frequency Division Multiple Access
MME Mobility Management Entity
CM Connection Management
AGW Access Gateway
UP User Plane
UPE User Plane Entity
IASA Inter-Access Anchor
PS Packet Switched
AS Application Server
IMS IP Multimedia Subsystem
MSS Mobile Softswitch Solution
MSC-S Mobile Switching Centre Server
PMSC Packet MSC
eMSC-S evolved MSC-S
IWU Interworking Unit
PCRF Policy Charging Rule Function
PCSC Packet CS Controller
MM Mobility Management
CM Connection Management
LA Location Area
LAI Location Area Identifier
SA Service Area
SAI Service Area Identifier
DTM Dual Transfer Mode
MMTel Multimedia Telephony
Gi Gi-Reference Point
Gs+ enhanced Gs-Reference Point
MGW Media Gateway
TA Tracking Area
VLR Visitor Location Register
SGSN Serving GPRS Support Node
DNS Domain Name Server
SMS Short Message Service
SS Supplementary Service
LCS Location Service

The invention claimed is:

1. A method of performing GSM/WCDMA (Global System for Mobile Communications/Wideband Code Division Multiple Access) CS (Circuit Switched) services over a LTE (Long Term Evolution) radio access, comprising:

performing CM (Connection Management) procedures via an AGW (Access Gateway) interconnected with a PMSC (Packet Mobile Switching Centre); and performing MM (Mobility Management) procedures via a MME (Mobility Management Entity) interconnected with the PMSC, and transporting the MM procedures over IP-based protocol between the PMSC and the terminal using the LTE radio access.

2. A method according to claim 1, wherein the CS services are performed between a terminal and a PSTN (Public Switched Telephone Network) via the PMSC.

3. A method according to claim 1, further comprising transporting the CM procedures between the AGW and a MSC-S (Mobile Switching Centre Server) of the PMSC using a PCSC (Packet CS Controller).

4. A method according to claim 1, wherein the MME provides information about the mobility of a terminal to the PMSC.

5. A combination of an AGW (Access Gateway) and a MME (Mobility Management Entity) for use in a telecommunication network for performing CS (Circuit Switched) services over a LTE (Long Term Evolution) radio access, wherein CM (Connection Management) procedures are arranged to be performed via the AGW (Access Gateway); and MM (Mobility Management) procedures are arranged to be performed via the MME (Mobility Management Entity), and wherein the MM procedures are arranged to be transported over IP-based protocol between the PMSC and the terminal using the LTE radio access.

6. A combination according to claim 5, wherein the CS services are arranged to be performed between a terminal and a PSTN (Public Switched Telephone Network) via a PMSC (Packet Mobile Switching Centre).

7. A combination according to claim 6, wherein the MME is arranged to provide information about the mobility of the terminal to the PMSC.

8. A combination according to claim 5, wherein the CM procedures are arranged to be transported between the AGW and a MSC-S (Mobile Switching Centre Server) of the PMSC using a PCSC (Packet CS Controller).

9. A MSC (Mobile Switching Centre) for use in a telecommunication network for performing CS (Circuit Switched) services over a LTE (Long Term Evolution) access, wherein the MSC comprises:

means for communicating with an AGW (Access Gateway) for performing CM (Connection Management) procedures via the AGW; and means for communicating with a MME (Mobility Management Entity) for performing MM (Mobility Management) procedures via the MME, and wherein the MM procedures are arranged to be transported over IP-based protocol between the MSC and the terminal using the LTE radio access.

10. The MSC according to claim 9, wherein the CS services are arranged to be performed between a terminal and a PSTN (Public Switched Telephone Network) via the MSC.

11. The MSC according to claim 9, wherein the MSC comprises a MSC-S (Mobile Switching Centre Server) and a PCSC (Packet CS Controller), wherein the CM procedures are arranged to be transported between the AGW and the MSC-S via the PCSC.

12. The MSC according to claim 9, wherein the MSC is arranged to receive information about the mobility of a terminal from the MME.

13. The MSC according to claim 9, wherein the MSC is a PMSC (Packet Mobile Switching Centre).

* * * * *